(12) United States Patent
Wittenberg

(10) Patent No.: US 6,820,903 B2
(45) Date of Patent: Nov. 23, 2004

(54) DRIVE APPARATUS FOR A BELT PLACER

(75) Inventor: Geert-Helge Wittenberg, Norderstedt (DE)

(73) Assignee: Autoliv Development AB (SE)

( * ) Notice: Subject to any disclaimer, the term of this patent is extended or adjusted under 35 U.S.C. 154(b) by 22 days.

(21) Appl. No.: 10/361,799

(22) Filed: Feb. 7, 2003

(65) Prior Publication Data

US 2003/0230885 A1 Dec. 18, 2003

(30) Foreign Application Priority Data

Feb. 7, 2002 (DE) .......................................... 102 04 940

(51) Int. Cl.[7] .............................................. B60R 22/03
(52) U.S. Cl. ...................................... 280/808; 297/481
(58) Field of Search .............................. 280/801.1, 803, 280/808; 297/481, 483, 486

(56) References Cited

U.S. PATENT DOCUMENTS

| | | | | |
|---|---|---|---|---|
| 3,781,061 A | * | 12/1973 | Walz et al. ................. | 297/469 |
| 4,175,633 A | * | 11/1979 | Andres et al. .............. | 180/270 |
| 4,629,214 A | * | 12/1986 | Fohl .......................... | 280/808 |
| 4,682,789 A | * | 7/1987 | Higuchi et al. .......... | 280/801.1 |
| 4,982,982 A | * | 1/1991 | Nishimura ................. | 280/808 |
| 5,431,446 A | * | 7/1995 | Czarnecki et al. ......... | 280/802 |
| 6,485,058 B1 | * | 11/2002 | Kohlndorfer et al. ....... | 280/808 |

FOREIGN PATENT DOCUMENTS

| | | |
|---|---|---|
| DE | 33 02 356 | 12/1986 |
| DE | 44 09 564 | 6/1995 |

* cited by examiner

Primary Examiner—David R. Dunn
(74) Attorney, Agent, or Firm—R W Becker & Associates; R W Becker

(57) ABSTRACT

A belt placer is provided for positioning the belt portion of a vehicle safety belt system and includes a drive apparatus and an engagement component that is drivably movable by the drive apparatus into engagement with a respective one of the belt and the closure tongue arranged on the belt. The engagement component positions the belt in a ready position relative to the vehicle occupant in which the belt is positioned for buckling and the engagement component being returned into its resting position in connection with buckling or unbuckling of the belt. The drive apparatus includes a feed roller and a flexible push- and pull-device in the form of a bending-resistant band which is brought from the flat disposition in which it is wound around the feed roller into an arched or cambered position around its longitudinal axis as it is unwound from the feed roller.

8 Claims, 2 Drawing Sheets

DRIVE APPARATUS FOR A BELT PLACER

BACKGROUND OF THE INVENTION

The present invention relates to a belt placer for placing the belt portion of a safety belt system in vehicles in a ready position, the belt placer comprising a driven engagement component that engages the belt, or the closure tongue arranged thereon, and positions the belt into a ready position relative to the vehicle occupant in which the safety belt is positioned for buckling and the engagement component being returned into its resting position in connection with buckling or unbuckling of the belt, wherein the drive for the engagement component is comprised of a flexible push- and pull-means windable onto a feed roller coupled to a rotational drive.

A belt placer having the above-noted features is disclosed in DE 33 02 356 A1. As is characteristic of conventional safety belt systems in which the belt portion carrying a closure tongue extends along the B-column of a vehicle behind the vehicle occupant to be buckled in in the uncoupled position of the belt, the above-noted belt placer comprises a curved conduit, which is mounted on the B-column so as to be covered thereby and is designed to not extend laterally outwardly of the B-column. Two push rods are extendable out of the guide conduit in a telescoping manner, whereby the furthest extending push rod supports an engagement component for engaging the belt or the closure tongue. A flexible, not further described push- and pull-means engages the furthest extending push rod, the flexible push- and pull-means, in accordance with an embodiment disclosed in the above-noted document, being respectively windable onto, or unwindable from, a drum storage element driven by a rotational drive. In the context of an automatic operation, it is provided, in this respect, that the belt placer is activatable in coordination with the vehicle occupant taking a seat in the vehicle and is de-activatable by, in particular, insertion of the closure tongue in the belt lock, so that, in connection with a buckled belt, the belt placer assumes its rest position; this rest position return action likewise occurs, as well, in connection with an unbuckled belt.

The disadvantage associated with this known belt placer is that the mechanical configuration thereof comprising the guide conduit and the associated telescopically extendable push rods, including the driven push- and pull-means, requires a considerable production and mounting effort.

SUMMARY OF THE INVENTION

The present invention provides a solution to the challenge of providing a simple drive arrangement for a belt placer having the state of the art features.

The solution to this challenge is set forth in the descriptions herein of the advantageous embodiments and further configurations of the invention and the patent claims.

The present invention provides, in accordance with its core concepts, that the flexible push- and pull-means is comprised of a bending-resistant band which is brought, as it is unwound from the feed roller, from the flat disposition in which it is wound around a feed roller into an arched or cambered position around its longitudinal axis. The present invention takes advantage of the recognition that a band which can be flexibly extended into an arched or cambered orientation around its longitudinal axis, but which is bending resistant, can, on the one hand, transmit uniform pulling and pushing forces and, on the other hand, can be flatly wound in a significantly space-saving manner onto a feed roller in a manner similar to that of a safety belt roller. Consequently, extensive or elaborate guide and storage mechanisms as are required in connection with the conventional state-of-the-art arrangements are avoided.

In a first embodiment of the invention, it is provided that the bending-resistant band is, in its transverse direction, formed with an elastic pre-stress and, upon unwinding thereof from the feed roller, the band extends in a self-actuating manner into an arched or cambered position around its longitudinal axis as it exits the feed roller. This purpose is furthered if the feed roller, which has the bending-resistant band wound thereon in its rest position, comprises two lateral support surfaces which extend at an inclination toward one another to engage respective lateral sides of the bending-resistant band as the band passes therebetween. During winding of the pre-formed band onto the feed roller, the lateral support surfaces mutually inclined toward one another engage the lateral sides of the bending-resistant band as the band is pressed flatly onto the feed roller and place the so-engaged band section in tension between themselves and the winding surface of the feed roller; upon unwinding of the band from the feed roller, the band once again assumes, in a self-actuating manner, its cambered configuration.

In an alternative embodiment of the invention, it is provided that the bending-resistant band is guided through a guide block disposed to engage the band after it has exited the feed roller with the bending-resistant band being converted into its arched or cambered position about its longitudinal axis by its passage through the guide block. Correspondingly, upon winding-up of the band in the opposite direction, the bending-resistant band is pulled through the guide block and is thereby converted from the arched or cambered position into its flat disposition suitable for winding up onto the feed roller.

In furtherance of the above-noted purpose, the bending-resistant band is expediently a steel band.

With respect to the rotational drive for the feed roller, it is provided, in an embodiment of the invention, that the rotational drive for the feed roller comprises a winding spring such as a winding spring of the type conventionally known for the winding-up of the belt onto a safety belt roller.

Alternatively, it can be provided that the feed roller is connected with a rotational drive serving as a component of the safety belt system. In an embodiment thereof, it can be provided that the feed roller is connected via a flexible shaft with the tightening-side drive of a belt roller tightening combination, which is a component of the safety belt system. In particular, in so far as the safety belt system comprises a belt roller with an electro-motor as the rotational drive which is operable as a reversible pre-tightener, the rotational drive for the feed roller can be connected via an additional actuable transmission step with the reversible tightener, so that, in connection with corresponding signals, the feed roller is drivingly rotated in the unwinding direction for unwinding of the bending-resistant band or, respectively, is driven in the winding-up direction for winding-up of the bending-resistant band.

An embodiment of the invention is illustrated in the figures of the drawing.

DETAILED DESCRIPTION OF THE PREFERRED EMBODIMENT

Figure 1:
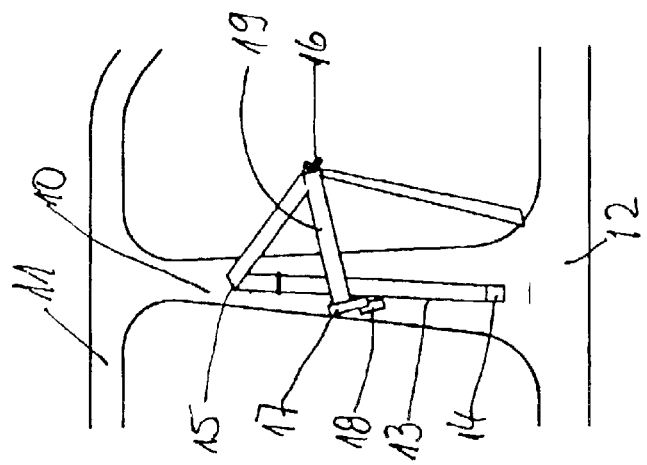
FIG. 1 is a schematic side elevational view of the B-column of a motor vehicle with the belt placer of the present invention shown in its rest position.
Figure 2:
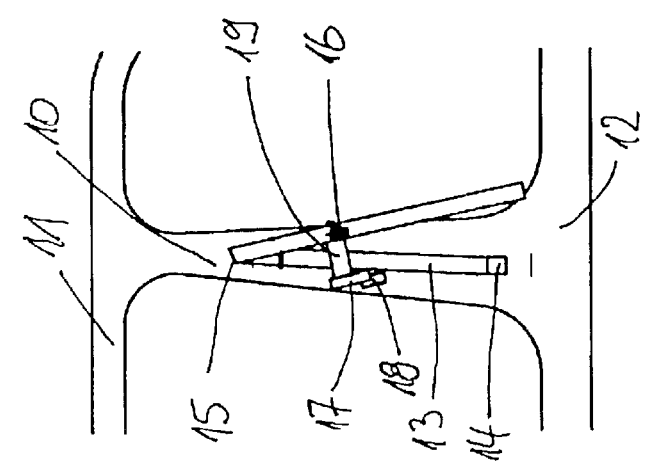
FIG. 2 is a schematic elevational view of the belt placer shown in FIG. 1 showing the belt placer extended partially outwardly as it engages the belt.
Figure 3:
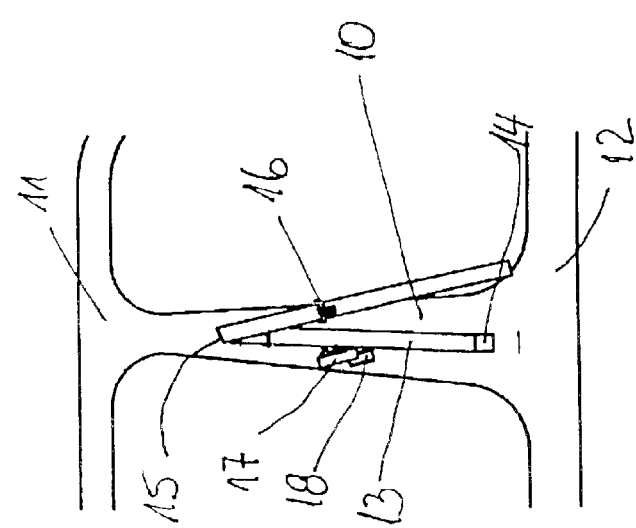
FIG. 3 is a schematic elevational view of the belt placer shown in FIG. 2, in which the belt placer has been extended outwardly to place the belt in its ready position.

The operation of the belt placer which is the subject matter of the present invention is illustrated in FIGS. 1–3. In this connection, the belt placer is mounted on a B-column 10, which extends in an upright manner between the roof column 11 and the floor beam 12 of a vehicle. A safety belt 13 extends in front of the B-column from a belt roller 14 secured in the area of the floor beam 12 to a change of direction component 15 provided in the upper region of the B-column 10. A closure tongue 16 is mounted on the angularly extending belt.

The belt placer comprises a feed roller 17, secured on the B-column 10 and having a drive motor 18 operatively connected thereto, the feed roller being shown in FIG. 1, in which the belt placer is shown in its rest position. As can be seen in FIG. 2, upon actuation of the belt placer via rotation of the feed roller 17 in the unwinding direction, a bending-resistant band 19 extends outward from the feed roller 17, the bending-resistant band initially extending to engage the safety belt 13 or, respectively, the closure tongue 16. As can be further seen in FIG. 3, the bending-resistant band of the belt placer extends outwardly during further movement until the safety belt 13 or, respectively, the closure tongue 16, is disposed in a ready position in which a not-illustrated vehicle occupant can grip the belt or, respectively, the closure tongue, and buckle the safety belt.

Figure 4:
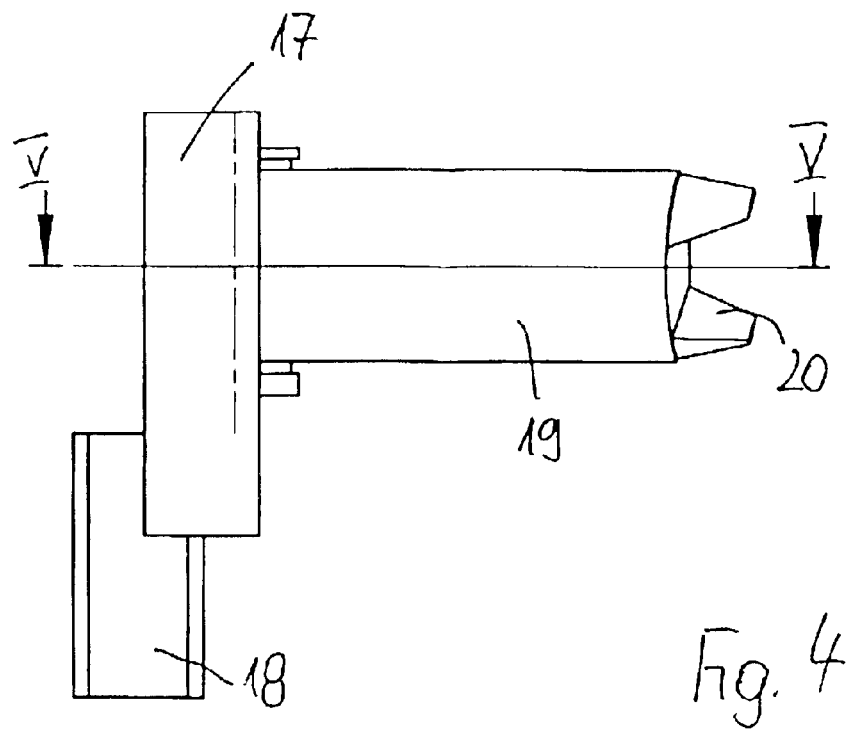
FIG. 4 is an enlarged elevational view of features of the belt placer in a partially extended position thereof.
Figure 5:
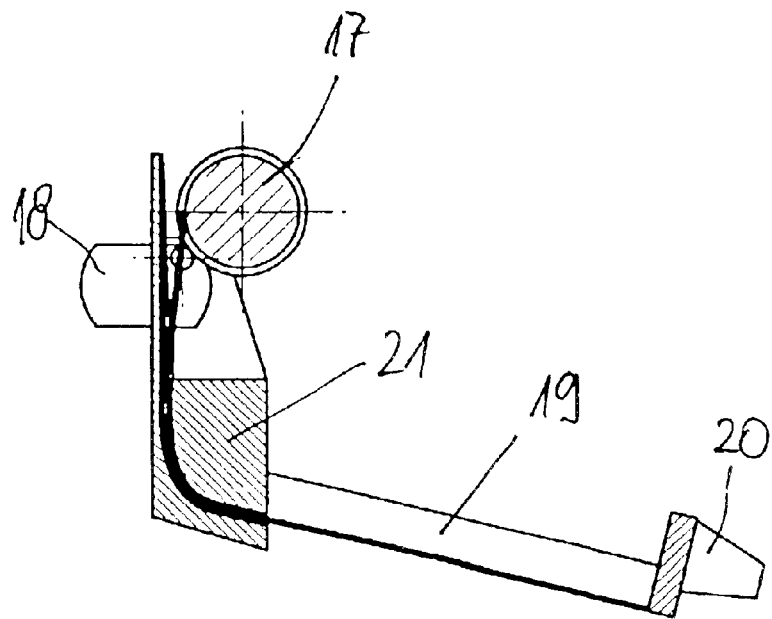
FIG. 5 is a top plan sectional view of the belt placer shown in FIG. 4 taken along line V—V of FIG. 4.

As can be seen in FIGS. 4 and 5, the flat bending-resistant band is wound onto a feed roller 17, which is rotated in the respective winding-up direction or unwinding direction via the associated drive motor 18. The bending-resistant band 19, upon exiting the feed roller 17, is guided through a guide block 21, which receives and guides the band 19 and whose guide slot guides the bending-resistant band along a cambered or arched path about its longitudinal axis, as can be seen in FIGS. 4 and 5. In this embodiment, the band 19 is in the position to transfer pulling and pushing forces whereby, to accomplish its function, the band 19 is provided with a prong or claw-type engagement component 20 on its front free end for engaging the safety belt 13 or, respectively, the closure tongue 16. Upon winding up of the band 19 onto the feed roller 17 via a corresponding rotation of the feed roller 17 in the winding-up direction, the band is again drawn through the guide block 21, whereby the band 19 is returned via the guide block 21 from its arched or cambered position about its longitudinal axis into its flat disposition in which it can be wound up onto the feed roller 17.

The specification incorporates by reference the disclosure of German priority document 102 04 940.8 filed Feb. 7, 2002.

The present invention is, of course, in no way restricted to the specific disclosure of the specification and drawings, but also encompasses any modifications within the scope of the appended claims.

What is claimed is:

1. A belt placer for positioning the belt portion of a vehicle safety belt system of the type having a belt, a closure tongue arranged on the belt, and a buckle component for releasably buckling the belt portion via insertion of the closure tongue into the buckle component, the belt placer comprising:

a drive apparatus; and an engagement component that is drivably movable by the drive apparatus into engagement with a respective one of the belt and the closure tongue arranged on the belt, the engagement component operating, by movement of the respective engaged one of the belt and the closure tongue, to position the belt in a ready position relative to the vehicle occupant in which the belt is positioned for buckling, and the engagement component being returned into its resting position in connection with buckling or unbuckling of the belt, the drive apparatus including a feed roller and a flexible push- and pull-means in the form of a bending-resistant band which is brought from a flat disposition in which it is wound around the feed roller into an arched or cambered position around its longitudinal axis as it is unwound from the feed roller.

2. A belt placer according to claim 1, wherein the bending-resistant band is, in its transverse direction, formed with an elastic pre-stress and, upon unwinding thereof from the feed roller, the band extends in a self-actuating manner into an arched or cambered position around its longitudinal axis as it exits the feed roller.

3. A belt placer according to claim 2, wherein the feed roller, which has the bending-resistant band wound thereon in its rest position, includes two lateral support surfaces which extend at an inclination toward one another to engage respective lateral sides of the bending-resistant band as the band passes therebetween.

4. A belt placer according to claim 1, and further comprising a guide block, the bending-resistant band being guided through the guide block after it has exited the feed roller, and the guide block operating to convert the bending-resistant band from the flat disposition in which it is wound around the feed roller into its arched or cambered position about its longitudinal axis.

5. A belt placer according to claim 1, wherein the bending-resistant band is a steel band.

6. A belt placer according to claim 1, wherein the feed roller is rotatably driven by a rotational drive in the form of a winding spring.

7. A belt placer according to claim 1, wherein the feed roller is connected with a rotational drive serving as a component of the safety belt system.

8. A belt placer according to claim 7, wherein the feed roller is connected via a flexible shaft with the tightening-side drive of a belt roller tightening combination which is a component of the safety belt system.

* * * * *